(12) United States Patent
Yousefhussien et al.

(10) Patent No.: US 11,869,192 B2
(45) Date of Patent: Jan. 9, 2024

(54) SYSTEM AND METHOD FOR VEGETATION MODELING USING SATELLITE IMAGERY AND/OR AERIAL IMAGERY

(71) Applicant: General Electric Company, Schenectady, NY (US)

(72) Inventors: Mohammed Yousefhussien, Clifton Park, NY (US); Arpit Jain, Dublin, CA (US); James Vradenburg Miller, Clifton Park, NY (US); Achalesh Kumar, San Ramon, CA (US); Walter V Dixon, III, Duanesburg, NY (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 17/091,725

(22) Filed: Nov. 6, 2020

(65) Prior Publication Data
US 2021/0142559 A1 May 13, 2021

Related U.S. Application Data

(60) Provisional application No. 62/932,679, filed on Nov. 8, 2019.

(51) Int. Cl.
*G06T 7/11* (2017.01)
*G06T 17/05* (2011.01)
(Continued)

(52) U.S. Cl.
CPC .......... *G06T 7/11* (2017.01); *G06Q 10/06312* (2013.01); *G06Q 10/06315* (2013.01);
(Continued)

(58) Field of Classification Search
CPC ......... G06T 17/05; G06T 7/11; G06V 20/188; G06Q 10/06312; G06Q 10/06315; G06Q 10/06393
(Continued)

(56) References Cited

U.S. PATENT DOCUMENTS 8,306,941 B2    11/2012  Ma
8,352,410 B2    1/2013   Rousselle et al.
(Continued)

FOREIGN PATENT DOCUMENTS

CN    107016725 A      8/2017
WO    2018/197862 A2   11/2018

OTHER PUBLICATIONS

Steven J. Mills AL, "Evaluation of Aerial Remote Sensing Techniques for Vegetation Management in Power-Line Corridors" (Year 2010), IEEE Transactions on Geoscience and Remote Sensing, vol. 48, No. 9, Sep. 2010, pp. 3379-3390, (Year 2010).*
(Continued)

*Primary Examiner* — Hai Tao Sun
(74) *Attorney, Agent, or Firm* — Buckley, Maschoff & Talwalkar LLC

(57) ABSTRACT

According to some embodiments, a system and method are provided comprising a vegetation module to receive image data from an image source; a memory for storing program instructions; a vegetation processor, coupled to the memory, and in communication with the vegetation module, and operative to execute program instructions to: receive image data; estimate a vegetation segmentation mask; generate at least one of a 3D point cloud and a 2.5D Digital Surface Model based on the received image data; estimate a relief surface using a digital terrain model; generate a vegetation masked digital surface model based on the digital terrain model, the vegetation segmentation mask and at least one of the 3D point cloud and the 2.5D DSM; generate a canopy height model based on the generated vegetation masked digital surface model; and generate at least one analysis with an analysis module, wherein the analysis module receives the generated canopy height model prior to execution of the analysis module, and wherein the analysis module uses the
(Continued)

generated canopy height model in the generation of the at least one analysis. Numerous other aspects are provided.

18 Claims, 9 Drawing Sheets

(51) Int. Cl.
*G06Q 10/06* (2023.01)
*G06Q 10/0631* (2023.01)
*G06Q 10/0639* (2023.01)
*G06V 20/10* (2022.01)
*G06V 10/764* (2022.01)
*G06V 10/82* (2022.01)
*G06N 3/04* (2023.01)
*G06N 3/08* (2023.01)

(52) U.S. Cl.
CPC ....... *G06Q 10/06393* (2013.01); *G06T 17/05* (2013.01); *G06V 10/764* (2022.01); *G06V 10/82* (2022.01); *G06V 20/188* (2022.01); *G06N 3/04* (2013.01); *G06N 3/08* (2013.01); *G06T 2207/10032* (2013.01); *G06T 2207/30188* (2013.01)

(58) Field of Classification Search
USPC ......................................................... 345/419
See application file for complete search history.

(56) References Cited

U.S. PATENT DOCUMENTS

| | | | |
|---|---|---|---|
| 2013/0063424 A1* | 3/2013 | Ueki ................... | H04N 13/261 345/419 |
| 2017/0076438 A1* | 3/2017 | Kottenstette ......... | G06V 10/451 |
| 2017/0178341 A1* | 6/2017 | El-Sheimy .............. | G06T 5/002 |
| 2017/0277953 A1 | 9/2017 | Stanley | |
| 2018/0046910 A1 | 2/2018 | Greene | |
| 2019/0080520 A1* | 3/2019 | Godzaridis ............. | G06F 30/20 |

OTHER PUBLICATIONS

Slatton, K. Clint et al., "Fusing Interferometric Radar and Laser Altimeter Data to Estimate Surface Topography and Vegetation Heights", IEEE Transactions on Geoscience and Remote Sensing, vol. 39, No. 11, Nov. 2001, (pp. 2470-2482, 13 total pages).

Wulder, Michael A. et al., "The role of LiDAR in sustainable forest management", The Forestry Chronicle, vol. 84, No. 6, Nov./Dec. 2008, (pp. 807-826, 20 total pages).

Deschaud, Jean-Emmanuel et al., "Automatic Data Driven Vegetation Modeling for Lidar Simulation", 2012 IEEE International Conference on Robotics and Automation, May 14-18, 2012, (pp. 5030-5036, 7 total pages).

International Search Report and Written Opinion dated Feb. 22, 2020 which was issued in connection with a counterpart application PCT/US20/59432.

Steven J Mills et al: "Evaluation of Aerial Remote Sensing Techniques for Vegetation Management in Power-Line Corridors", IEEE Transactions on GeoSci ence and Remote Sensing, IEEE Servi ce Center, Piscataway, NJ, us,vol. 48, No. 9, Sep. 1, 2010 (Sep. 1, 2010), pp. 3379-3390, XP011309408, ISSN: 0196-2892 the whole document.

Korkmaz Ozgor et al: "Tree detection in urban regions from aerial imagery and DSM based on local maxima points", Proceedings of SPIE; [Proceedings of SPIE ISSN 0277-786X vol. 10524], SPIE, US, vol. 10190, May 4, 2017 (May 4, 2017), pp. 1019019-1019019, XP060088901, DOI: 10.1117/12.2262268 ISBN: 978-1-5106-1533-5 the whole document.

D'Angelo Pablo et al: "3D Semantic Segmentation from Multi-View Optical Satellite Images", IGARSS 2019-2019 IEEE International Geoscience and Remote Sensing Symposium, IEEE, Jul. 28, 2019 (Jul. 28, 2019), pp. 5053-5056, XP033656808, DOI: 10.1109/IGARSS.2019.8899795 [retrieved on Nov. 13, 2019] the whole document.

Waser et al: "Assessing changes of forest area and shrub encroachment in a mire ecosystem using digital surface models and CIR aerial images", Remote Sensing of Environment, Elsevier, xx. vol. 112, No. 5, Feb. 15, 2008 (Feb. 15, 2008), pp. 1956-1968, XP022577149, ISSN: 0034-4257.

Park Wan-Yong et al: "Estimation of forest canopy height using orthoimage-refined digital elevation models", Landscape and Ecological Engineering, Springer Japan, Tokyo, vol. 11, No. 1, Dec. 6, 2013 (Dec. 6, 2013), pp. 73-86, XP035437631.

Ledouz Hugo et al: "What is a digital terrain model?", Lecture Notes for Digital terrain modelling course in TU Delft, Nov. 1, 2018 (Nov. 1, 2018), pp. 1-10, XP55775628, Retrieved from the Internet: URL:https://3d.bk.tudelft.nl/courses/backu p/geo1015/2018/data/geo1015 -01.pdf the whole document.

* cited by examiner

Original

Segmented

| A Index | Type | Size | |
|---|---|---|---|
| 0 | Dict | 2 | {'Area_Ratio':0.3644405779661069, 'Area': 215} |
| 1 | Dict | 2 | {'Area_Ratio':0.1696113287547097 'Area': 99} |
| 2 | Dict | 2 | {'Area_Ratio':0.5547393362667701, 'Area': 300} |
| 3 | Dict | 2 | {'Area_Ratio':0.2582417582417527, 'Area': 141} |
| 4 | Dict | 2 | {'Area_Ratio':0.4205933682373473, 'Area': 241} |
| 5 | Dict | 2 | {'Area_Ratio':0.6695004195004196, 'Area': 383} |
| 6 | Dict | 2 | {'Area_Ratio':0.1017241379310448, 'Area': 59} |
| 7 | Dict | 2 | {'Area_Ratio':0.1507790901300482, 'Area': 07} |
| 8 | Dict | 2 | {'Area_Ratio':0.2851724137031044, 'Area': 110} |
| 9 | Dict | 2 | {'Area_Ratio':0.2168883287570077, 'Area': 137} |
| 10 | Dict | 2 | {'Area_Ratio':0.2435054935064935, 'Area': 150} |
| 11 | Dict | 2 | {'Area_Ratio':0.2539184952970564, 'Area': 162} |
| 12 | Dict | 2 | {'Area_Ratio':0.2266766026866643815, 'Area': 179} |
| 13 | Dict | 2 | {'Area_Ratio':0.1561561561565616, 'Area': 16} |
| ... | | | |
| 21 | Dict | 2 | {'Area_Ratio':0.0, 'Area': 0} |
| 22 | Dict | 2 | {'Area_Ratio':0.0093970093970094, 'Area': 43} |
| 23 | Dict | 2 | {'Area_Ratio':0.0, 'Area': 0} |

602

```
},{
    "Area_Ratio": "0.3333333333333333",
    "Area": "10"
},{
    "Area_Ratio": "0.0",
    "Area": "0"
},{
    "Area_Ratio": "0.4255319148893617",
    "Area": "20"
},{
    "Area_Ratio": "0.0689655172413793l",
    "Area": "2"
},{
    "Area_Ratio": "0.0",
    "Area": "0"
},
...
},{
    "Area_Ratio": "0.7940717794871794O",
    "Area": "31"
},{
    "Area_Ratio": "0.7857142857142857",
    "Area": "22"
},{
```

FIG. 6

SYSTEM AND METHOD FOR VEGETATION MODELING USING SATELLITE IMAGERY AND/OR AERIAL IMAGERY

The present application claims priority from the following U.S. Provisional Patent Application, which is hereby incorporated by reference herein in its entirety for all purposes: U.S. Provisional Patent Application Ser. No. 62/932,679, filed Nov. 8, 2019, and entitled "SYSTEM AND METHOD FOR VEGETATION MODELING USING SATELLITE IMAGERY AND/OR AERIAL IMAGERY".

CROSS-REFERENCE TO RELATED APPLICATION

The present application is related to U.S. patent application Ser. No. 17,091,748, filed Nov. 6, 2020, entitled "MULTISOURCE GEOGRAPHIC INFORMATION SYSTEM (GIS) WEB BASED DATA VISUALIZATION AND INTERACTION FOR VEGETATION MANAGEMENT" which claims priority to U.S. Provisional Patent Application Ser. No. 62/932,676, filed Nov. 8, 2019, entitled "MULTISOURCE GEOGRAPHIC INFORMATION SYSTEM (GIS) WEB BASED DATA VISUALIZATION AND INTERACTION FOR VEGETATION MANAGEMENT", both of which are hereby incorporated herein by reference in their entirety for all purposes.

BACKGROUND

Vegetation management is important to maintain reliable power distribution, as appropriate vegetation management may prevent forest fires, and unexpected power shutdown due to vegetation related incidences. A utility company may provide the power via power lines. As part of vegetation management, the utility company may determine the proximity of the vegetation to the power lines. Conventionally this determination may be based on an individual walking the grounds near the power lines to observe the status of the vegetation. However, the manual walking and observation process may be time consuming and infrequent. For example, the walking/observation may be on a fixed trimming schedule in combination with reactive trimming based on outages and utility customer complaints. An attempt has been made to automate the determination of the proximity of the vegetation to the power lines via a LiDAR (Light detection and ranging) sensor aimed out of helicopters and/or drones to generate a 3D representation of the vegetation. However, the use of LiDAR sensors is very expensive, and may take a long time to collect and process.

It would be desirable to provide systems and methods to improve vegetation management.

SUMMARY

According to some embodiments, a system is provided including a vegetation module to receive image data from an image source; a memory for storing program instructions; a vegetation processor, coupled to the memory, and in communication with the vegetation module, and operative to execute program instructions to: receive image data; estimate a vegetation segmentation mask; generate at least one of a 3D point cloud and a 2.5D Digital Surface Model based on the received image data; estimate a relief surface using a digital terrain model; generate a vegetation masked digital surface model based on the digital terrain model, the vegetation segmentation mask and at least one of the 3D point cloud and the 2.5D DSM; generate a canopy height model based on the generated vegetation masked digital surface model; and generate at least one analysis with an analysis module, wherein the analysis module receives the generated canopy height model prior to execution of the analysis module, and wherein the analysis module uses the generated canopy height model in the generation of the at least one analysis.

According to some embodiments, a method is provided including receiving image data; estimating a vegetation segmentation mask; generating at least one of a 3D point cloud and a 2.5D Digital Surface Model based on the received image data; estimating a relief surface using a digital terrain model; generating a vegetation masked digital surface model based on the digital terrain model, the vegetation segmentation mask and at least one of the 3D point cloud and the 2.5D DSM; generating a canopy height model based on the generated vegetation masked digital surface model; and generating at least one analysis with an analysis module, wherein the analysis module receives the generated canopy height model prior to execution of the analysis module, and wherein the analysis module uses the generated canopy height model in the generation of the at least one analysis.

According to some embodiments, a non-transitory computer-readable medium is provided, the medium storing program instructions that when executed by a computer processor cause the processor to perform a method including receiving image data; estimating a vegetation segmentation mask; generating at least one of a 3D point cloud and a 2.5D Digital Surface Model based on the received image data; estimating a relief surface using a digital terrain model; generating a vegetation masked digital surface model based on the digital terrain model, the vegetation segmentation mask and at least one of the 3D point cloud and the 2.5D DSM; generating a canopy height model based on the generated vegetation masked digital surface model; and generating at least one analysis with an analysis module, wherein the analysis module receives the generated canopy height model prior to execution of the analysis module, and wherein the analysis module uses the generated canopy height model in the generation of the at least one analysis.

A technical effect of some embodiments of the invention is an improved and/or computerized technique and system for determining a location of vegetation in an area of interest (AOI) and estimating a height of this located vegetation. One or more embodiments may provide for the fusion of satellite data coming at different frequencies and resolutions for analysis of trim cycles for the vegetation, risk management, and other analysis. The fusion of data from multiple sources may be used to provide an accurate status of vegetation and assist an operator in making informed decisions. One or more embodiments may provide for satellite/aerial image analysis of vegetation by fusing information from medium-, high- and ultra-high-resolution data. Medium- and high-resolution data may be satellite and aerial imagery data that is freely available (e.g., sentinel satellite data and National Agriculture Imagery Program (NAIP) imagery, respectively) and whose ground sampling distance (GSD)>=60 cm. As used herein, ultra-high-resolution satellite data may refer to commercial satellite data with GSD of less than 60 cm. It is noted that the different categories of medium, high, and ultra-high may point to different resolutions of data coming from different sources at different resolutions. It is further noted that the classification of medium, high and ultra-high may or may not be strictly based on sampling distance. One or more embodiments may provide for the segmentation of trees in the satellite data to estimate the tree area cover and tree line length to trim. One or more embodiments may provide for the 3D reconstruction of trees and estimation of their height to provide accurate volume of tree trimming tasks. The satellite-based analysis may help in identifying various large assets to the utility company/user and may provide accurate localization of them. Currently a lot of the assets are not accurately mapped. The satellite and/or aerial data used in one or more embodiments may avoid the need for expensive and slow LiDAR data collection, and may provide height information for the vegetation. One or more embodiments may provide for significant saving of resources and money with better vegetation optimized trimming schedules, better planning of resources and better planning of expected work, by moving away from fixed vegetation trimming schedules to need-based/risk-based scheduling. The fusion of analytics on multi-modal data, such as LiDAR, aerial imagery and satellite data, in one or more embodiments, may improve the trim cycle of the transmission and distribution providers by providing accurate analytical data to plan trimmings in advance and distribute resources based on need. One or more embodiments may use the multi-modal data to compute different vegetation-related key performance indicators to provide a more accurate status of the vegetation for decisioning. One or more embodiments may provide for reduced outages and may transition the vegetation management system from reactive to preventive maintenance, which may result in economic savings. For example, risk modeling associated with vegetation may be provided by one or more embodiments, and may help in prioritizing resource allocation and planning.

One or more embodiments provide for a vegetation module to generate a vegetation segmentation mask. A deep neural network-based vegetation segmentation process may be applied to the satellite/aerial data to obtain vegetation cover. A multi-view 3D reconstruction pipeline may be used, in one or more embodiments, with ultra-high-resolution satellite data to obtain height associated with vegetation. Using the information from the vegetation cover and the height, one or more embodiments may provide accurate volume of tree trimming required for an area of interest (AOI) for a user, including but not limited to utility companies. One or more embodiments may identify all the transmission/distribution/power lines where vegetation is encroaching within a given buffer zone. The vegetation module may be deployed on a cloud-based computer infrastructure, local machine or be part of a webservice to a larger vegetation management system. In one or more embodiments, the vegetation module may use the satellite/aerial data to model terrain/hilly regions in an AOI, which may be used to model the risk associated with vegetation falling in those areas; as well as to identify roads and pavement regions which may be used to measure accessibility and help plan better for vegetation trimming schedules.

The vegetation segmentation mask may be applied to at least one of satellite and aerial images of an area of interest that have been processed to generate a canopy height model, that represents the canopy height relative to the ground surface. The canopy height model may, in one or more embodiments, be used for: providing height validation of the vegetation; guiding LiDAR scans (e.g., embodiments may identify regions that may use a more detailed LiDAR scan); trim cycle scheduling; determining vegetation encroachment to power lines, tree cover, tree volume; and providing disaster response such as canopy fire suppression. One or more embodiments may use the hyperspectral imagery for species classification and for the design of custom growth models at a tree level. In one or more embodiments, hyperspectral data may be collected through a different sensor which may be collected simultaneously with aerial imagery and/or LiDAR from a helicopter or drone. It is noted that some satellites may also collect hyperspectral data, but the resolution may be lower. The vegetation module may, in one or more embodiments, predict a healthy versus unhealthy vegetation status for given vegetation using a machine learning model that has been trained with multi-/hyperspectral data.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

FIG. 6 illustrates data according to some embodiments.

DETAILED DESCRIPTION

Figure 1:
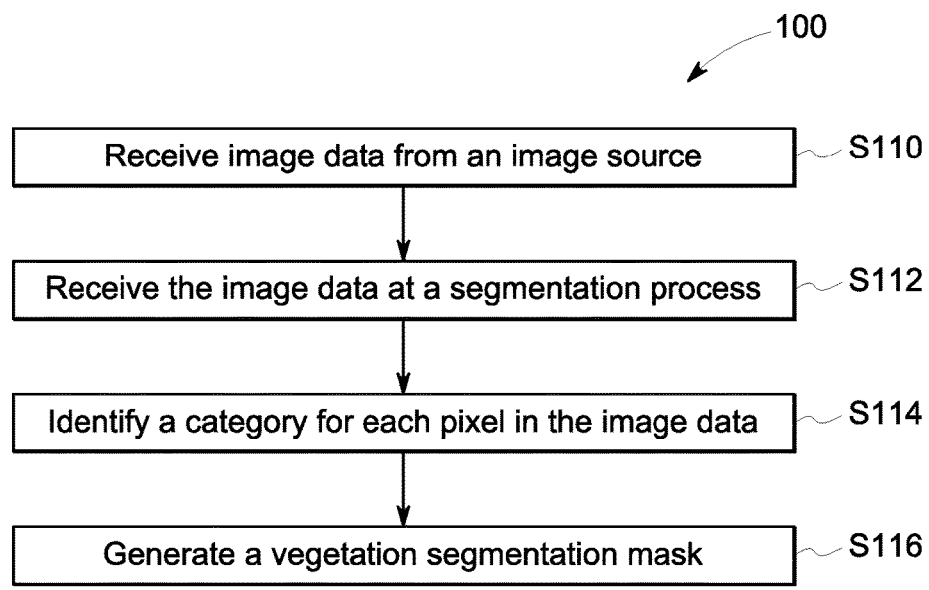
FIG. 1 illustrates a flow diagram according to some embodiments.

Vegetation management is important to maintain reliable power distribution, as appropriate vegetation management (e.g., vegetation trimming) may prevent forest fires, and unexpected power shutdown due to vegetation related incidences. Current approaches to vegetation management are primarily based on fixed trimming schedules (e.g., trim an area every two or four years) in combination with reactive trimming based on outages and customer complaints. With fixed trimming schedules, the utility company does not know the underlying status of how much the trees have grown or are even still there. As used herein, the term "trees" and "vegetation" may be used interchangeably, although "vegetation" may also refer to shrubs, bushes and grasses. One or more embodiments may provide a more efficient and proactive process for vegetation management and the allocation of resources (e.g., trim a particular area earlier because of the vegetation growth, do not trim in a particular area because the trees aren't encroaching powerlines or other assets or have been cut/fallen, etc.). Embodiments may reduce unnecessary trimming schedules and facilitate redeployment of resources to trim trees in risky regions.

In one or more embodiments, a vegetation module may receive satellite and/or aerial imagery and may determine the location of trees in a given area of interest. Then the vegetation module may generate a digital surface model in conjunction with digital terrain model for the given area of interest (AOI) to determine a height of the trees in the given AOI. The tree location and tree height may then be used to compute vegetation related metrics, statistics or key performance indicators (KPIs) that can be used for height validation, LiDAR scan guidance, trim cycle scheduling, vegetation encroachment to power lines, and disaster response such as canopy fire suppression.

Turning to FIGS. 1-9, flow diagrams 100 (FIG. 1) and 800 (FIG. 8) and associated diagrams, of an example of operation according to some embodiments is provided. In particular, FIGS. 1 and 8 each provide a flow diagram of a process 100/800, according to some embodiments. Processes 100/800, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 300 is conditioned to perform the process 100 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Figure 2A:
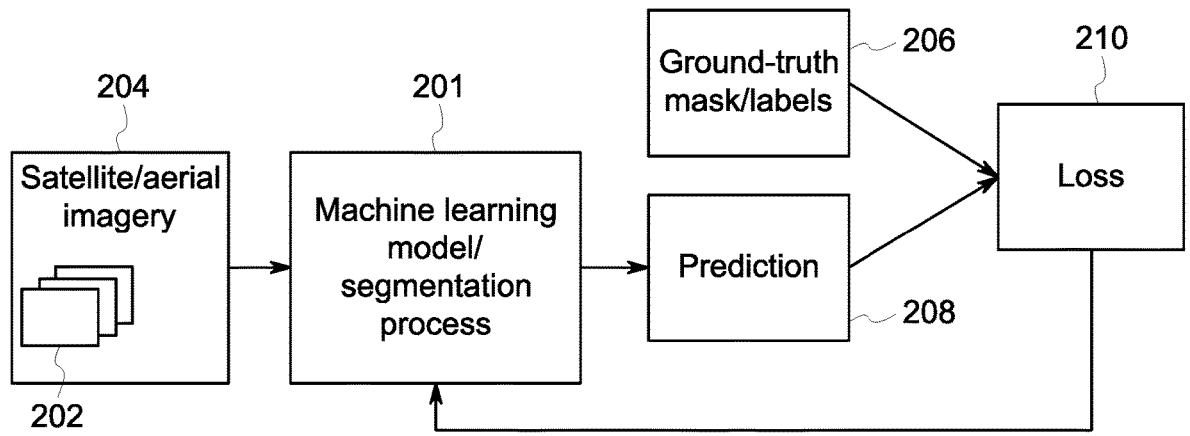
FIGS. 2A and 2B illustrate block diagrams of a system according to some embodiments.

Prior to the start of the process 100, a machine learning (ML) model 201 may be trained to automatically identify each pixel in image data as belonging to a certain category (e.g., vegetation, road, background, building, etc.), and may be referred to herein as a "segmentation process". The ML model 201 may be trained on satellite data to identify vegetation. In one or more embodiments, the ML model 201 may be trained for species classification to determine which species the vegetation belongs to (if hyperspectral data is available, for example). The training procedure may be supervised, semi-supervised or unsupervised. In unsupervised training, the segmentation process 201 may identify each pixel as belonging to a particular category without the segmentation process 201 being taught what to look for explicitly. In semi-supervised training, only part of the data is labeled, the rest is unlabeled, and the model learns to predict the class of each pixel by a little supervision coming from labeled data and by leveraging large unlabeled data to augment training. In a supervised training, as shown in FIG. 2A for example, each image 202 in a training set 204 may be accompanied by a corresponding desired output label (ground-truth mask/labels) 206 for each pixel. The segmentation process 201 then predicts a category 208 for each pixel based on the training. The prediction 208 (predicted category) is then compared to the desired output label 206, and a loss 210 is calculated. The loss 210 represents the errors in the prediction as compared to the desired output label. The loss 210 may be returned to the segmentation process 201 to further train the segmentation process 201. The goal of the supervised training is to learn a representation so as to minimize the error in predicting the desired category. The process to model the data may be based on deep learning networks, and in particular on artificial neural networks or on traditional learning based on hand-crafted feature and learning techniques, including, but not limited to, Support Vector Machine, Random Forest, Boosting, etc. As a non-exhaustive example, a variant of an artificial neural network called Convolution Neural Network (CNN) may be used to produce state of the art results for image data. The variant (e.g., type of CNN algorithm) may be Residual-Unet or any other suitable CNN architecture. The variant may identify a category of each pixel in the image.

Figure 2B:
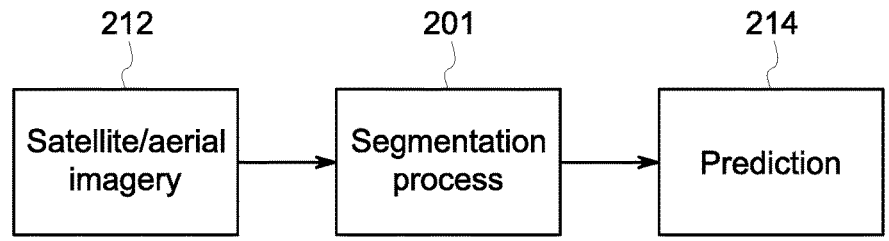

After the segmentation process 201 is trained, it may be used to predict a category for each pixel. As shown in FIG. 2B, for example, image data 212 that is not a training set is received at the segmentation process 201, whereby the segmentation process 201 generates a prediction 214 over the whole input image data 212 that a given pixel belongs to a particular category. It is noted that the image may be of any size covering the AOI or parts of it. If the status of vegetation within the AOI is the only element of interest, the predictions of the pixels outside of the AOI may be ignored or not considered in computing Key Performance Indicators (KPIs).

It is noted that in one or more embodiments, object detection and/or segmentation processes may be deployed together to detect objects of interest such as buildings, electrical assets and structures.

Figure 4A:
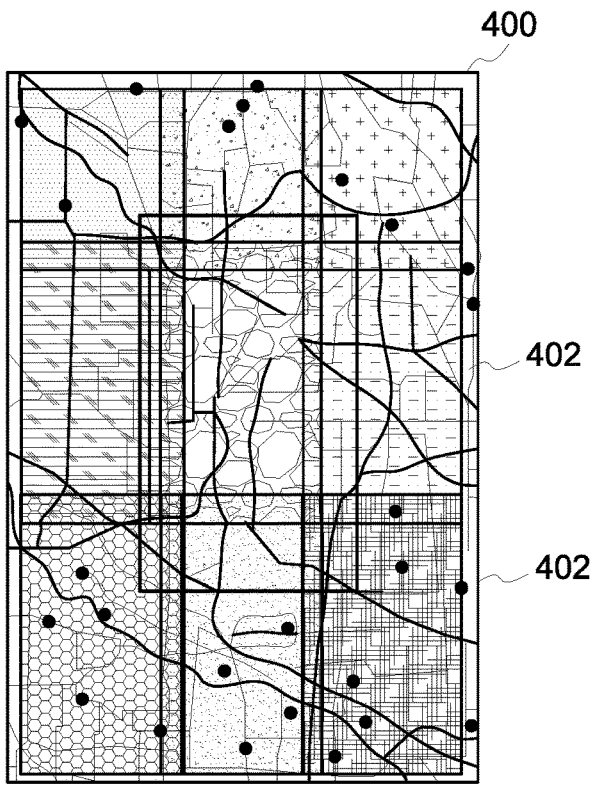
FIGS. 4A and 4B illustrate areas of interest according to some embodiments.
Figure 4B:
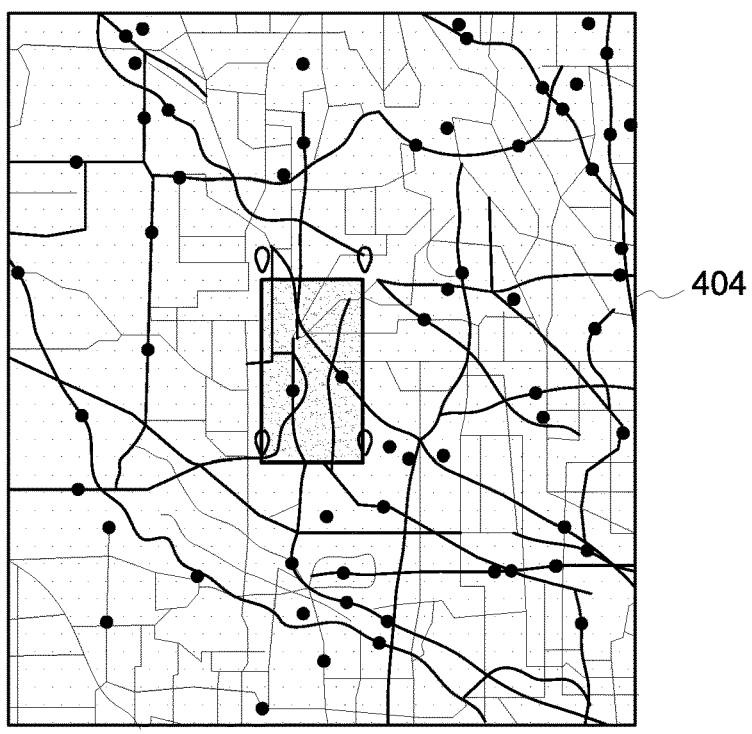

Initially, at S110, image data 502 (FIG. 5A) is received at the vegetation module 302 from at least one image source 307 for a given area of interest (AOI) 400. The image data 502 may include a plurality of pixels 309. The plurality of pixels 309 together may represent the given AOI 400. The image source 307 may be government agencies or commercial satellite data providers. The image data 502 may be at least one of satellite image data and aerial image data. The data that forms the received image data 502 may be at a same resolution or a different resolution. With the satellite data, the image data 502 may be a result of multi-resolution satellite fusion that is a result of up-sampling and feature based alignment, including analytics to combine multi-resolution satellite data, which are at different frequencies. Satellite data is frequently saved in a tile format in a repository, where each tile includes image data for a particular area. For example, FIG. 4A, shows a plurality of tiles 402 that include the received image data 502. However, the AOI 400 may not be contained in a single tile, but instead may be spread among several parts of different tiles. As such, one or more embodiments provide for the AOI 400 to be extracted from the NAIP image data 502 by cropping regions belonging to AOI from whichever plurality of tiles it is spread among, and presenting the cropped regions representing the AOI 400 as a single tile 404, as shown in FIG. 4B.

Figure 5A:
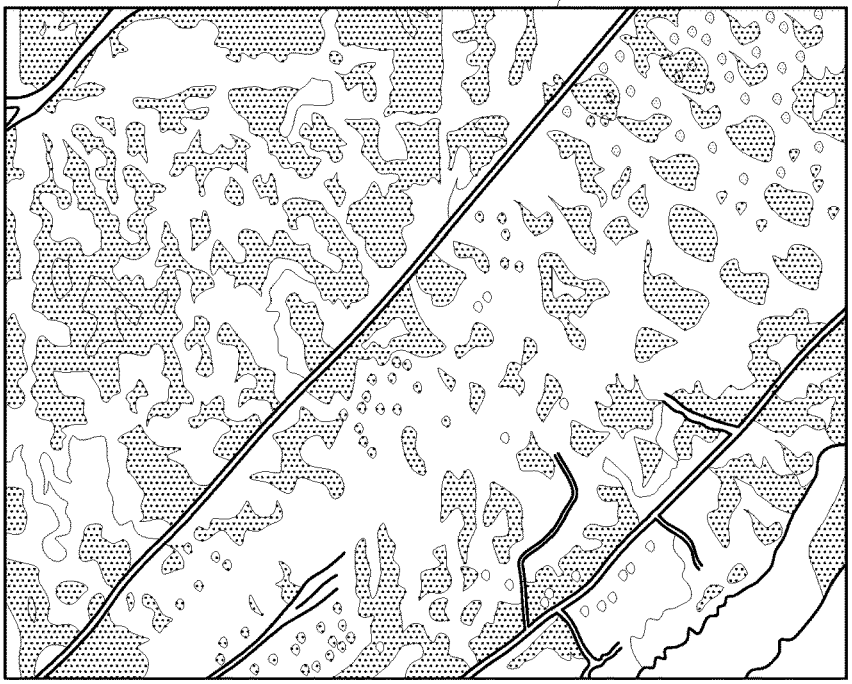
FIGS. 5A and 5B illustrate areas of interest according to some embodiments.
Figure 5B:
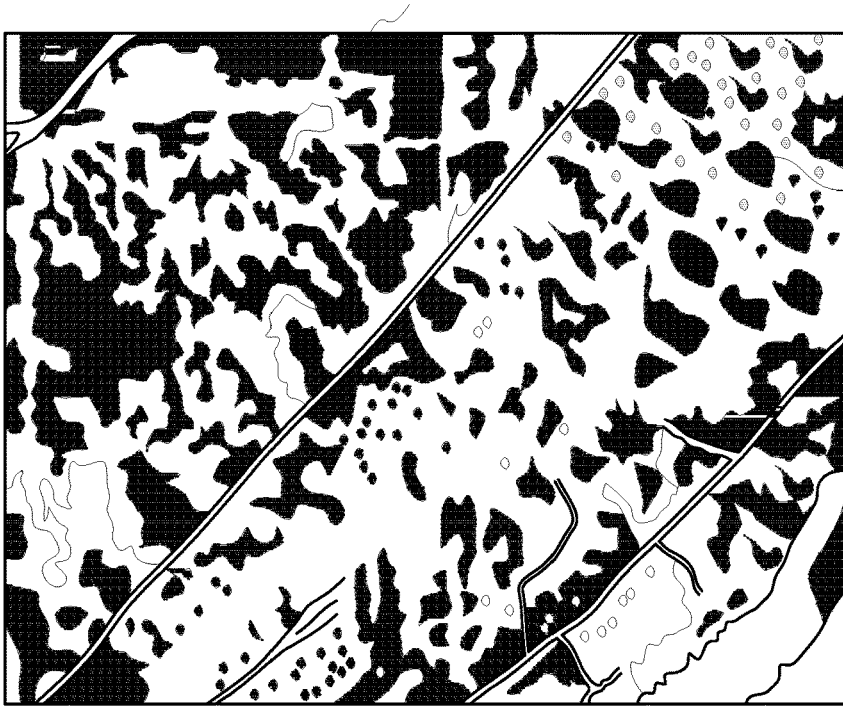

Then in S112, the received image data 502 is received at a segmentation process 201 of the vegetation module 302. The segmentation process 201 is executed in S114 to identify which category (vegetation, roads, houses, non-vegetation, etc.) each pixel in the AOI 400 belongs to. The segmentation process 201 provides a prediction 214 of probability that each pixel belongs to a given category based on the ML models. The prediction 214 may be referred to as "a mask". In embodiments, the segmentation process 201 includes a threshold probability per category. In a case the probability for the given pixel is below the threshold probability, it does not belong to that category; in a case the probability for the given pixel is above the threshold probability, the pixel does belong to that category. As a non-exhaustive example, image data 502 is received at the segmentation process 201. The segmentation process 201 is executed and may output a segmented image 504 (FIG. 5B) in S116. As used herein, the segmented image 504 may be a combination of the mask 214 overlaid on the image data 502, whereby the mask 214 is visualized as markings 506 on the image data 502. As described above, the mask 214 may be a prediction map in the form of a binary map indicating whether the pixel belongs to the given category or does not belong to the given category. In one or more embodiments, the mask 214 may be visualized as markings 506 to form the segmented image 504 allowing a user to visually identify the pixel as belonging to the given category. As shown in FIG. 5B, the mask 214 overlays the image data 502, such that the pixels categorized as trees are marked 506 to indicate the vegetation pixels on the segmented image 504. As used herein, in a case that the markings 506 on the segmented image 504 identify the vegetation pixels, the mask 214 may be referred to as a "Vegetation Segmentation Mask". In one or more embodiments, the mask 214 may be overlaid on the original image 502 with an identifying color (or other identifier) to form the segmented image 504. It is noted that the original probability prediction may also be referred to as a segmentation mask, and any map which can pinpoint the class related information of each pixel in the image may be referred to as a "segmentation mask". In one or more embodiments, the output of the segmentation process 201 may be in a form different from, or in addition to, the segmented image 504. For example, the output of the segmentation process 201 may be a segmentation table 602 (FIG. 6), a JSON file, or any other suitable output.

Figure 7:
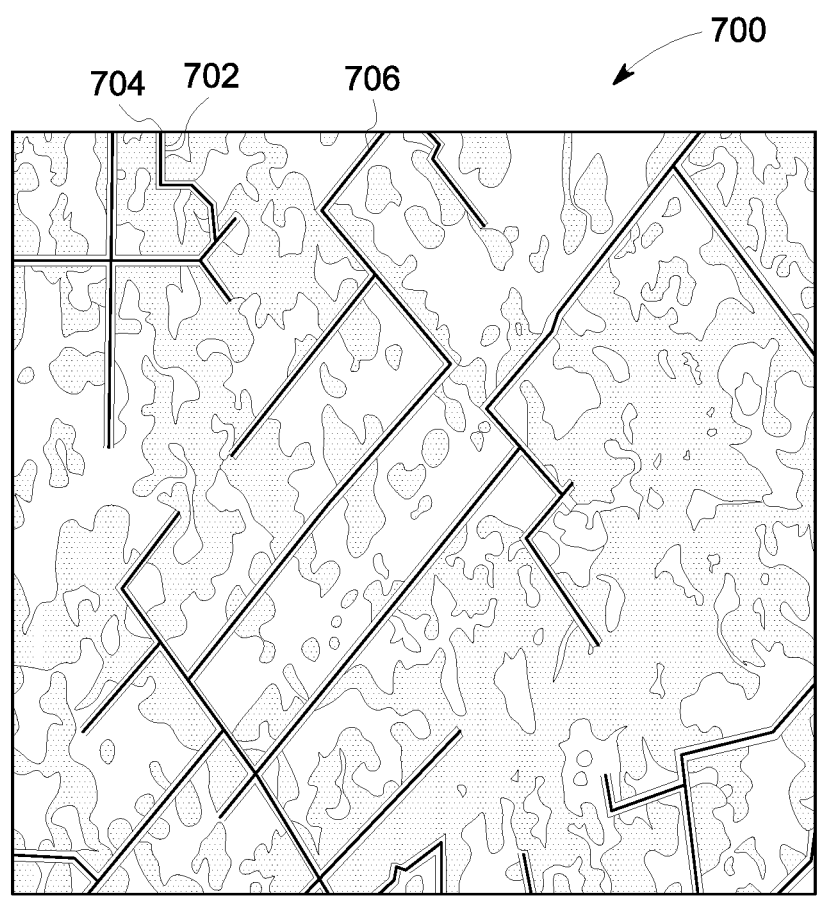
FIG. 7 illustrates an area of interest according to some embodiments.

As will be further described below, once the segmentation process 201 is executed to provide a category/label for each pixel in the AOI, and/or coordinates of boxes within the AOI, the vegetation segmentation mask 214 may then be used to measure a plurality of statistics for vegetation management. The plurality of statistics may be referred to as Key Performance Indicators (KPIs). One non-exhaustive example of a KPI is vegetation density (represented by the number of tree pixels in a given area of interest), which may refer to vegetation encroaching the power lines within a certain pre-defined buffer zone 702 (e.g., 5 m on either side of a power line). For example, FIG. 7 provides a segmented image 700 that also includes power lines 704 over-laid thereon. The power lines 704 may be marked with thin lines, and the buffer zone 702 may be indicated by a width of the banded line that overlays the power lines 704. In one or more embodiments, the banded region of the buffer zone 702 may be color coded 706 (e.g., from blue to pink) to indicate a number of trees along the power lines 704 within the buffer zone. As a non-exhaustive example, blue may indicate there are no trees, and the color may change to pink to indicate lot of trees in the buffer zone. While there may be other ways to visualize the KPIs and statistics, in the non-exhaustive example shown herein, the visualization identifies high vegetation regions in the transmission and distribution lines 704. Any vegetation within the buffer zone 702 may require trimming, and the extent of vegetation encroachment within the buffer zone 702 may signal the urgency to trim the vegetation.

Height may also be an important factor in determining the risk associated with a given tree to a power line, together with the extent of encroachment in the buffer zone. In some instances, the image data 212 may only provide the encroachment in an x-y plane (along Earth's surface). The problem with showing encroachment in only an x-y plane may be that in case that the tree is shorter than a power line, when viewing the tree and power line from top down in a satellite or aerial image, the height information is missing, and a user cannot see the tree is shorter than the power line. Rather, all the user can see is that the tree is near the powerline. As described further below, the vegetation module 302 may, in one or more embodiments, use the tree segmentation process together with a height estimation process to compute useful KPIs to determine risk associated with power lines at individual line levels/circuit levels. This information may enable a vegetation management engineer to better plan his schedule so that they may attend to risky vegetation in a more timely manner. The engineer may also prevent unseen incidents (e.g., power outages and forest fires) by better utilizing resources.

In order to estimate canopy height for vegetation management, a 3D representation of trees may be used in one or more embodiments. The 3D reconstruction of the AOI may be generated from Multiview satellite data. The vegetation module, as described further below, may generate at least one of a 3D point cloud and 2.5D surface model, where height information with respect to a ground reference is estimated.

Figure 8:
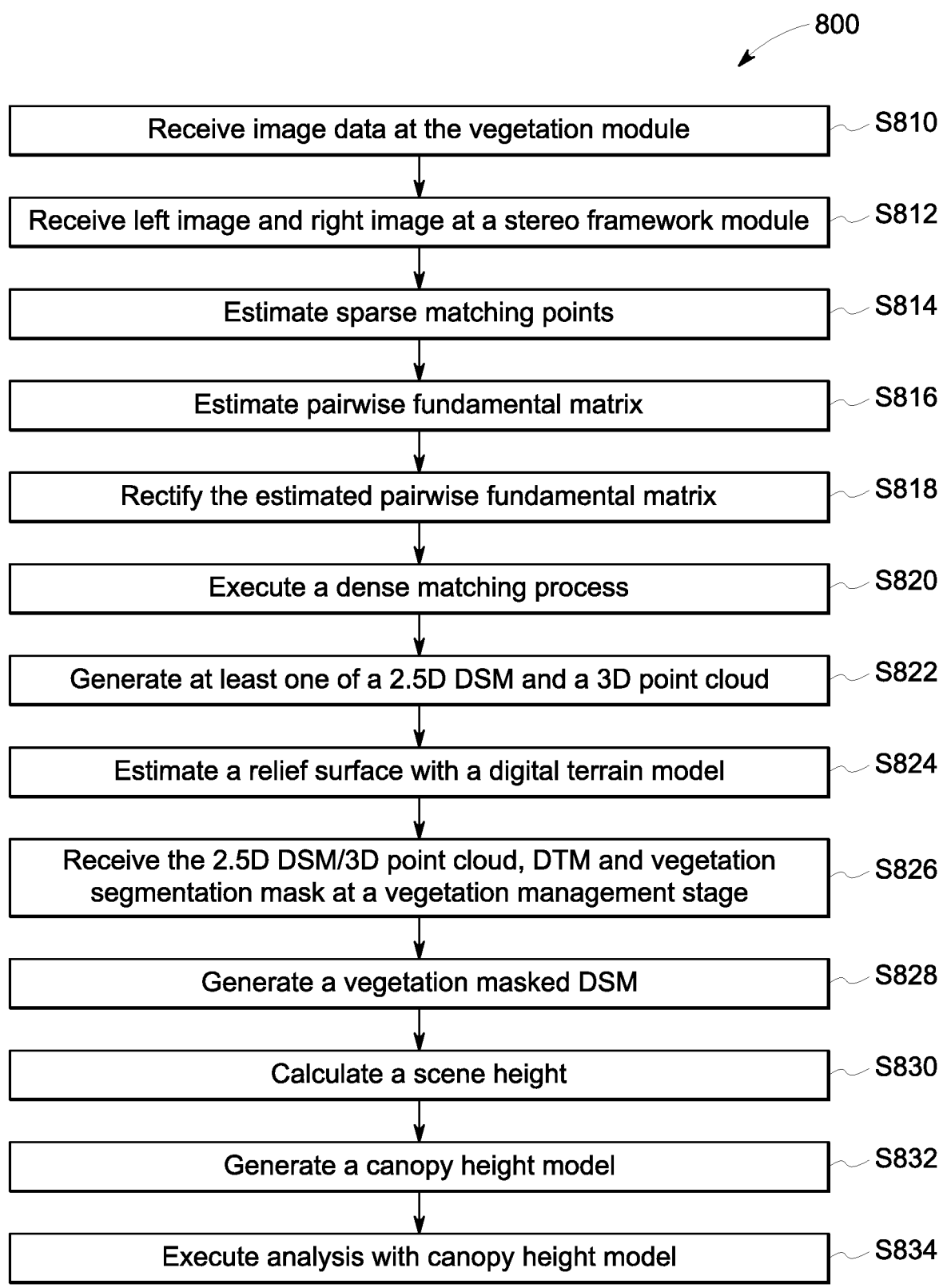
FIG. 8 illustrates a flow diagram according to some embodiments.

Turning to FIG. 8, a process 800 that uses series reconstruction to determine a height of the vegetation is provided. The height may be represented in a 2.5D image 900 or on a 3D point cloud 902. It is noted that while many of the examples described herein are with respect to using a 2.5D depth map to compute tree height, the processing steps described herein for computing tree height may be used with the 3D point cloud generated from the multi-view stereo reconstruction. Initially, at S810, image data 212 is received at the vegetation module 302 from an image source 307. It is noted that the image data received at S810 may be the same image data used to make the vegetation segmentation mask, or may be image data from another source. In one or more embodiments, the same or different sources of data may be used for 3D reconstruction and vegetation segmentation. It is noted that for 3D reconstruction, the fields of view from the images overlap (i.e., images are of the same scene, but from different perspectives). The image data may be multiple satellite images for a given AOI that overlap in terms of field of view to allow for stereoscopic disparity estimation. The more overlapping images available, the more complete a reconstruction can be. In addition to the amount of overlap between images, multiple factors may affect the quality of images, including, but not limited to, the sun angle, the cloud density, and the satellite obliquity angle. These factors may be selected carefully to minimize their undesired effect.

The image data may be a pair of images or a collection of multiple image pairs, where each image in the pair is of the area of interest as taken from a different viewing angle (e.g., left image 301 and right image 303), and provide a stereo or multi-view stereo representation of the AOI. It is noted that in embodiments, each image in the pair may be taken at a same or different time, take with the same or different sensors, where the sensors are at the same or different positions. It is noted there may be a fusion step that combines the results from all the pairs of images. For example, in one or more embodiments, the vegetation module 302 may find feature correspondences between the pairs of images, including refining the correspondences to sub-pixel level and filtering points which belong to non-interesting regions, such as bodies of water, etc. The vegetation module 302 may then triangulate the points in 3D based on satellite locations and camera parameters, and then perform bundle adjustments to reduce the reconstruction error. Then, given a depth map, the vegetation module 302 may estimate terrain and hill slopes to obtain a height, as described further below. The computation of terrain and hill slopes may also be done directly on a 3D point cloud obtained from multi-view stereo reconstruction.

Turning back to the process 800, after the image data is received in S810, the left image 301 and the right image 303 are received at a stereo framework module 305 (including a Stereo pipeline). It is noted that multiple pairs may be received for multi-view stereo reconstruction at the framework module 305. The stereo framework module 305 may use any suitable stereo reconstruction process that will operate with rectified stereo images. Non-exhaustive examples of stereo reconstruction processes include Semi-Global Matching (SGM), More Global Matching (MGM) and COLMAP. The stereo framework module 305 executes a sparse point matching process 306 for each pair of images (left image 301 and right image 303) of a scene at a given time, to estimate sparse matching points in S814. The estimated sparse matching points are then received at a fundamental matrix process 308, which estimates the pair-wise fundamental matrix in S816. In S818, an epi-polar rectification process 310 rectifies the estimated pairwise fundamental matrix using epi-polar geometry to reduce the dense search for stereo matching from 2D to 1D, thereby reducing the search space (from 2D to 1D) and improving the accuracy so there is better matching between the left image 301 and the right image 303. It is noted that the epi-polar rectification process 310 may simplify the formulation of finding the correspondence to do the 3D reconstruction from the left image and the right image. A dense matching process 312 is executed in S820 to match all of the pixels from the left image 301 to the pixels in the right image 303. Next, in S822 at least one of a 3D point cloud 902 (FIG. 9) and a 2.5D DSM 900 (FIG. 9) are generated. The 3D point cloud may be binned to a 2.5D grid, known as depth image. The inventors note that in a 3D point cloud, every point has an xyz coordinate value, but there may be no regular grid pattern, so the 3D point cloud may be a less information rich format than a 2.5D format. To that end, an operation may be performed ("binning") to represent the 3D point cloud in grid structure, in a format called a 2.5D grid. The 2.5D grid is a representation of the 3D point cloud in the form of an image. It is noted that, in one or more embodiments, at the beginning of the process, multiple pairs of images are present. While the process described herein is with respect to a single pair of images from the scene, it applies to the rest of the pairs of images, and at a later time all results are combined into a single output. As such, the binning process may be repeated for all other pairs of images, and multiple depth images of the same AOI are acquired and combined into a single depth image. The single depth image may be referred to as a Digital Surface Model (DSM), and in this case, a 2.5D DSM 314. In one or more embodiments the entire binning process may also be done directly on the 3D point cloud to merge the multiple 3D point clouds obtained from multiple pairs. This process may result in a merged 3D point cloud, which may or may not then be converted into a DSM image.

Then in S824, a digital terrain model (DTM) 316 is used to estimate the relief surface (e.g., ground points) only in the AOI. As a non-exhaustive example, the DTM described in co-pending U.S. patent application Ser. No. 16/591,928 entitled "REMOTE SENSING METHOD TO MODEL TERRAIN SHAPE BY DETECTING RELIABLE GROUND POINTS" may be used to estimate the ground points. Other suitable digital terrain models may be used.

Next, in S826, the 2.5D DSM 314 and the DTM 316, as well as the vegetation segmentation mask 214 are received at a vegetation management stage 318. The vegetation segmentation mask 214 may be applied to the 2.5D DSM 314 in S828 to generate a vegetation masked DSM 320, whereby the vegetation/trees are localized/identified and marked in the 2.5D DSM. The vegetation masked DSM 320 may isolate the vegetation of interest in one or more embodiments.

Figure 9:
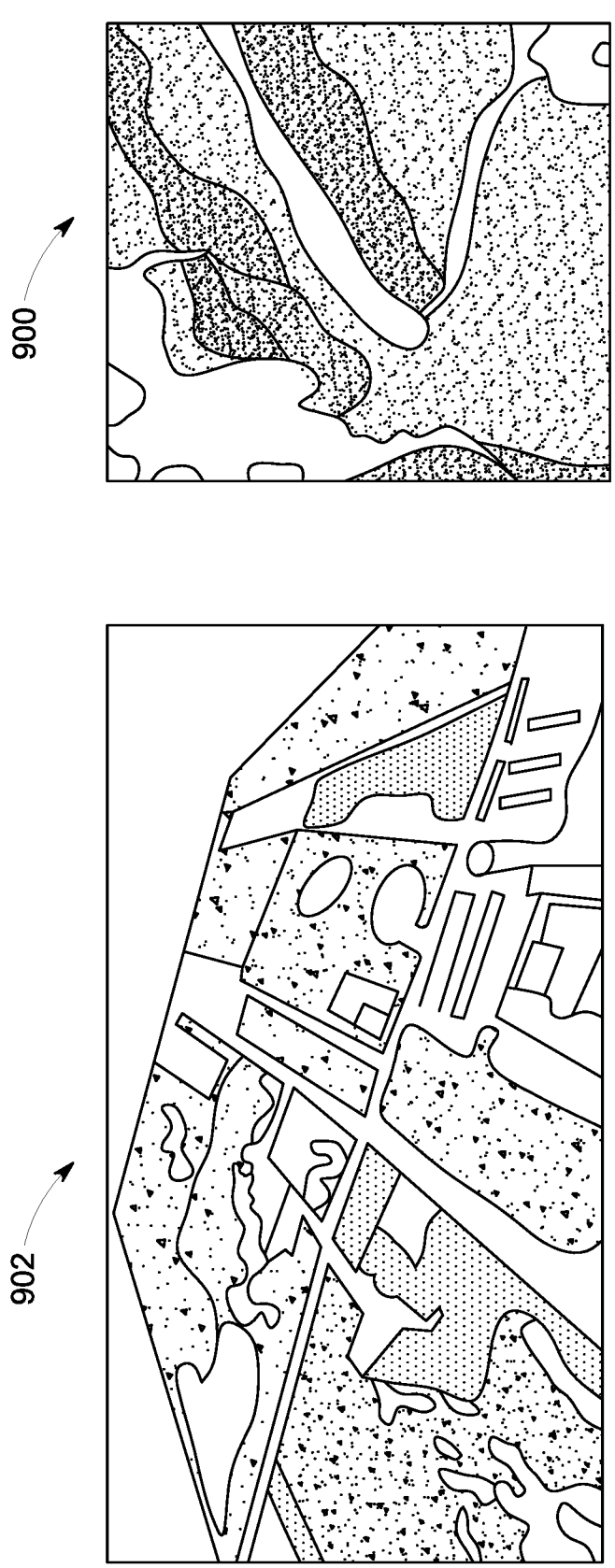
FIG. 9 illustrates an area of interest in 2.5D according to some embodiments.

The DTM 316 may be used by the vegetation management stage 318 to determine a height of an object. As described above, the 2.5D DSM 314 may represent the surface of all elements/objects (man-made, ground, and vegetation) in an AOI, and the 2.5D DSM is an image of the 3D point cloud. As such, the height information for the objects displayed in the 2.5D DSM is obtained from the 3D point cloud. The 3D point cloud may indicate the distance of an object from the satellite camera. The brightness of a pixel in the 2.5D DSM 314 may indicate the height of the object captured by that pixel relative to a satellite's frame of reference. In other words, the 2.5D DSM is not normalized with respect to the Earth's surface. In the 2.5D DSM 314, each pixel has a brightness, and the brightness may indicate the distance the object is from the satellite camera (e.g., the closer to the satellite camera (and therefore further from the ground and the higher the object), the brighter the pixel). As a non-exhaustive example, in the 2.5D DSM 900 shown in FIG. 9, the brightness of each pixel represents the height, and the brighter pixels indicate taller elements, as compared to a darker pixel (e.g., the black pixels in FIG. 9 represent the ground/height of zero).

A terrain normalization process 322 is then executed in S830. The terrain normalization process 322 calculates a scene height with reference to the ground points, by subtracting the DTM 316 from the vegetation masked DSM 320. It is noted that the mask is used such that the height is computed at places where there is vegetation. In one or more embodiments, the DSM provides height information for each pixel in the image with respect to an arbitrary reference point, and the DTM 316 also provides the ground level with respect to the same arbitrary reference point. The calculated scene height is the height of each pixel in the AOI when referring to the original DSM. When referring to the vegetation masked DSM 320, the calculated scene height is the vegetation height.

The inventors note that while tree height may be computed directly from the 3D point cloud, or from the DSM image, it may be easier for the vegetation module 302 to compute the vegetation height from the vegetation masked DSM as the vegetation masked DSM specifies what is represented by the point—e.g., a tree, as opposed to the 3D point cloud, which gives a plurality of non-categorized points (e.g., the point may be a road or a building or a tree, etc.).

The vegetation management stage 318 may use the output of the terrain normalization process 322 to generate a Canopy Height Model (CHM) 324 in S832, which is a 2.5D image representing the canopy (e.g., vegetation) height relative to the ground surface. In one or more embodiments CHM=DSM−DTM, such that the CHM is the residual after removing the ground bias from the digital surface model (i.e., flattening the ground surface of the DSM). The CHM 324 may be used to define what the risk is as it provides the height of the trees relative to the ground. For example, a user may indicate that anything below 10 meters is not a risk, and the user may filter the data in the CHM to determine whether the vegetation is a risk or not.

In S834, an analysis module 326 may receive the CHM 324 as input, and execution of the analysis module 326 may output further analysis. The analysis module 326 may be executed, using the CHM 324 as input, to output an analysis for height validation, LiDAR scan guidance, trim cycle scheduling, vegetation encroachment to power lines, disaster response (e.g., canopy fire suppression), and any other suitable measure. The output of the analysis module 326 may be received at at least one of a vegetation management module 340, an allocation module for resource planning 342 and a tree-trimming scheduling module 344. The output may be received at a user platform 352 any other suitable system 356. It is noted that with respect to LiDAR scan guidance, a user may, based on the CHM 324, select which region on which to focus a LiDAR scan to get a better resolution image. The better resolution image may, in turn, provide for better vegetation management planning. In one or more embodiments, raw LiDAR data wherever available may be combined with the output of the vegetation module 302 to improve the fidelity of results. LiDAR may provide raw height values and multiple returns information for each scan line. This information together with the image data may be used to improve the accuracy of height and segmentation of the tree purely from satellite/aerial data. It is noted that the processed LiDAR data given by data collection companies may already have tree canopies identified in them. There may be significant errors in canopy shape and size in this processed LiDAR data due to errors in the algorithm used to identify the tree canopies. The satellite/aerial image analytics described herein by one or more embodiments may improve tree boundaries and KPIs.

It is also noted that when reference is made herein to satellite images, this is a non-exhaustive example, and the same process may be applied to aerial images. In some instances, with the aerial images, the data may be pre-processed to make it ortho-rectified and mapped accurately to a global coordinate system.

Figure 3:
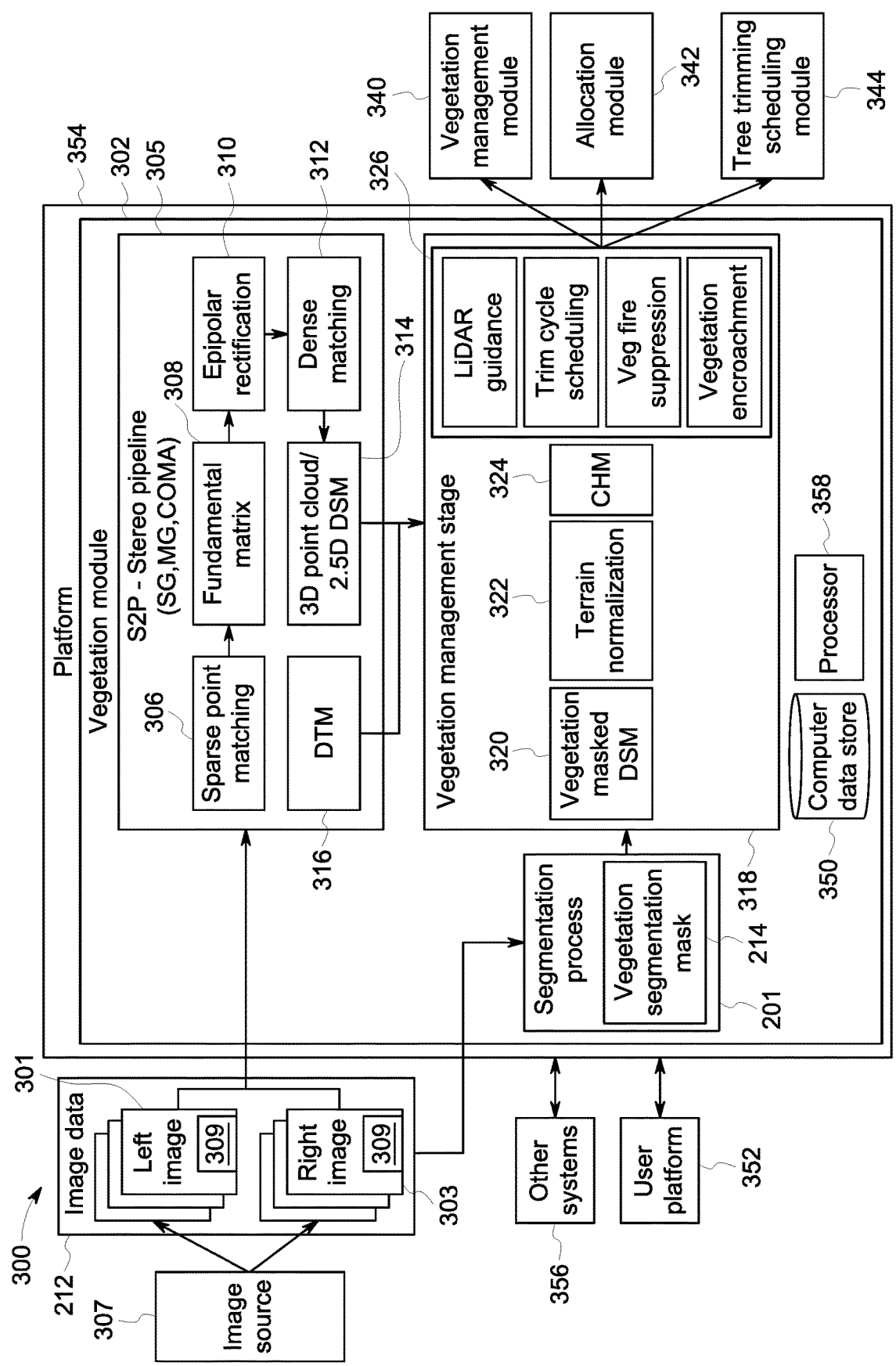
FIG. 3 illustrates a block diagram of a system architecture according to some embodiments.

It is noted that FIG. 3 represents a logical architecture for describing processes according to some embodiments, and actual implementations may include more, or different, components arranged in other manners. Embodiments are not limited to system architecture 300.

Architecture 300 includes a vegetation module 302, a data store 350 (e.g., database) and a user platform 352. In one or more embodiments, the vegetation module 302 may reside on a platform 354. Platform 354 provides any suitable interfaces through which users/user platforms 352/other systems 356 may communicate with the vegetation module 302.

In one or more embodiments, the output of the vegetation module 302 may be output to the user platform 352 (a control system, a desktop computer, a laptop computer, a personal digital assistant, a tablet, a smartphone, etc.), so that a user may view information about the vegetation in an AOI. In one or more embodiments, the output from the vegetation module 302 may be transmitted to various user platforms 352 or to other system (356), as appropriate (e.g., for display to, and manipulation by, a user, further analysis and manipulation).

In one or more embodiments, the system 300 may include one or more processing elements 358 and a memory/computer data store 350. The processor 358 may, for example, be a microprocessor, and may operate to control the overall functioning of the vegetation module 302. In one or more embodiments, the vegetation module 302 may include a communication controller for allowing the processor 358 and hence the vegetation module 302, to engage in communication over data networks with other devices (e.g., user platform 352 and other system 356).

In one or more embodiments, the system 300 may include one or more memory and/or data storage devices 350 that store data that may be used by the module. The data stored in the data store 350 may be received from disparate hardware and software systems, some of which are not inter-operational with one another. The systems may comprise a back-end data environment employed by a business, industrial or personal context.

In one or more embodiments, the data store 350 may comprise any combination of one or more of a hard disk drive, RAM (random access memory), ROM (read only memory), flash memory, etc. The memory/data storage devices 350 may store software that programs the processor 358 and the vegetation module 302 to perform functionality as described herein.

As used herein, devices, including those associated with the system 300 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 10:
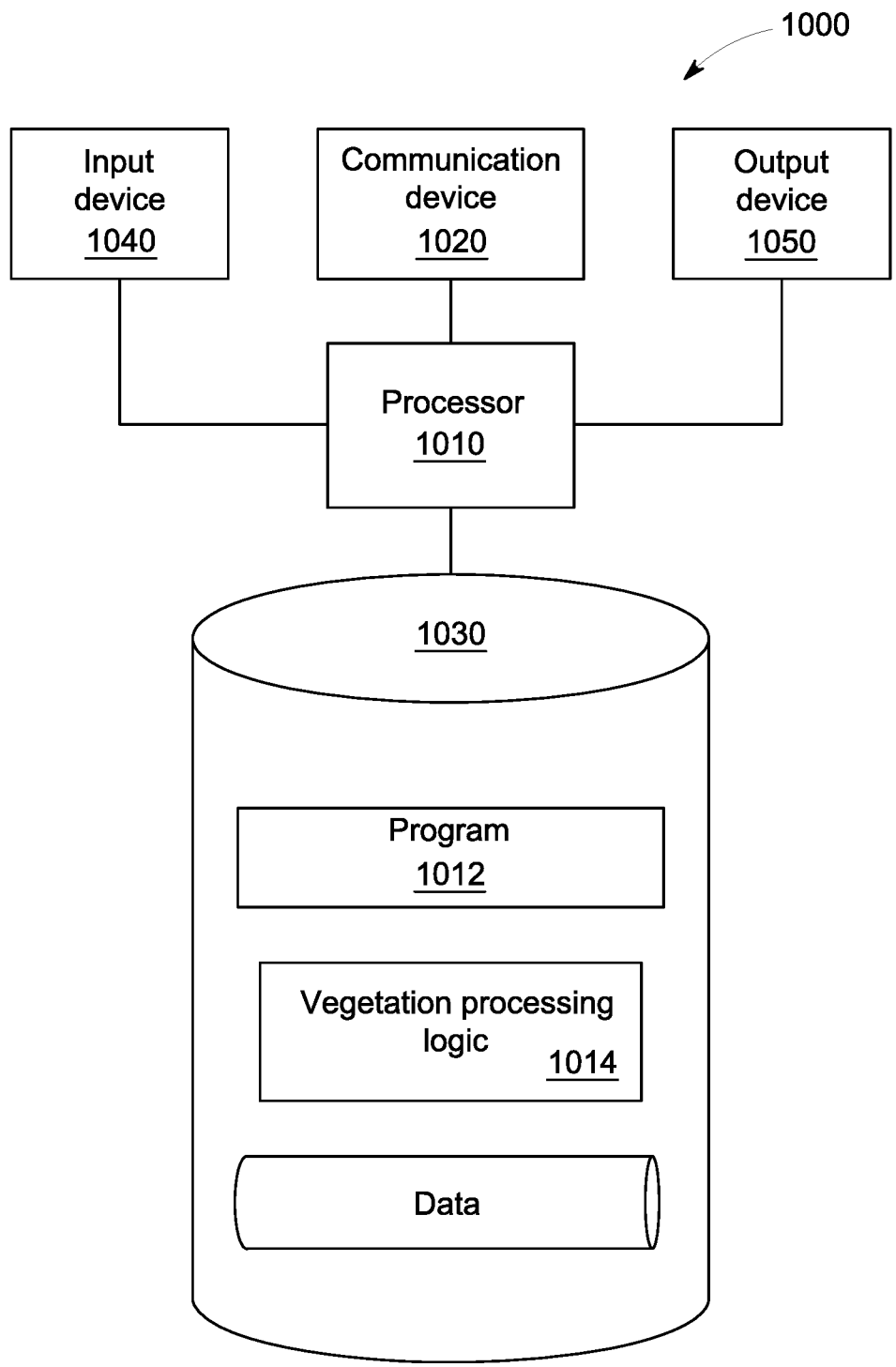
FIG. 10 illustrates a block diagram of a system according to some embodiments.

Note the embodiments described herein may be implemented using any number of different hardware configurations. For example, FIG. 10 illustrates a vegetation platform 1000 that may be, for example, associated with the system 300 of FIG. 3. The vegetation platform 1000 comprises a vegetation processor 1010 ("processor"), such as one or more commercially available Central Processing Units (CPUs) and/or Graphical Processing Units (GPUs) in the form of one-chip microprocessors, coupled to a communication device 1020 configured to communicate via a communication network (not shown in FIG. 10). The communication device 1020 may be used to communicate, for example, with one or more users. The vegetation platform 1000 further includes an input device 1040 (e.g., a mouse and/or keyboard to enter information) and an output device 1050 (e.g., to output the outcome of module execution).

The processor 1010 also communicates with a memory/storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 may store a program 1012 and/or vegetation processing logic 1014 for controlling the processor 1010. The processor 1010 performs instructions of the programs 1012, 1014, and thereby operates in accordance with any of the embodiments described herein. For example, the processor 1010 may receive data and then may apply the instructions of the programs 1012, 1014 to determine whether location and height of the vegetation.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 1010 (FIG. 10). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system comprising:
   a vegetation module to receive image data from an image source;
   a memory for storing program instructions;
   a vegetation processor, coupled to the memory, and in communication with the vegetation module, and operative to execute program instructions to:
   receive image data;
   estimate a vegetation segmentation mask;
   generate a 2.5D Digital Surface Model based on the received image data, wherein the 2.5D Digital Surface Model is a representation of a 3D point cloud as a 2.5D grid format and the representation is generated via a binning process that combines multiple depth images of a same area of interest to merge the multiple depth images into a single depth image;
   estimate a relief surface using a digital terrain model, wherein the digital terrain model is a model of shapes of a terrain over a region and across a range of terrain types;
   generate a vegetation masked digital surface model based on the digital terrain model, the vegetation segmentation mask and the 2.5D Digital Surface Model;
   generate a canopy height model based on the generated vegetation masked digital surface model; and
   generate at least one analysis with an analysis module, wherein the analysis module receives the generated canopy height model prior to execution of the analysis module, and wherein the analysis module uses the generated canopy height model in the generation of the at least one analysis.

2. The system of claim 1, further comprising program instructions to:
   compute at least one of: at least one Key Performance Indicator and one or more vegetation-related statistics.

3. The system of claim 2, further comprising program instructions to:
   receive the computation by at least one of a vegetation management module, an allocation module for resource planning and a tree-trimming scheduling module.

4. The system of claim 1, wherein estimation of the vegetation segmentation mask further comprises program instructions to:
   receive the image data at a segmentation process, wherein the image data includes a plurality of pixels representing an area of interest;
   identify a category for each pixel in the area of interest;
   mark the received image with the identified category for each pixel; and output the marked received image as the vegetation segmentation mask.

5. The system of claim 4, wherein the mark identifies the vegetation pixels.

6. The system of claim 1, wherein the received image is a pair of images for an area of interest, and a first image of the pair of images is an image of the area of interest taken at a different angle from a second image of the pair of images.

7. The system of claim 6, wherein generation of the 2.5D Digital Surface Model based on the received image data further comprises program instructions to:
   match all of the pixels from the first image to corresponding pixels in the second image; and
   generate the 3D point cloud.

8. The system of claim 7, wherein the 2.5D Digital Surface Model represents a surface of each element in the area of interest.

9. A method comprising:
   receiving image data;
   estimating a vegetation segmentation mask;
   generating a 2.5D Digital Surface Model based on the received image data, wherein the 2.5D Digital Surface Model is a representation of a 3D point cloud as a 2.5D grid format and the representation is generated via a binning process that combines multiple depth images of a same area of interest to merge the multiple depth images into a single depth image;
   estimating a relief surface using a digital terrain model, wherein the digital terrain model is a model of shapes of a terrain over a region and across a range of terrain types;
   generating a vegetation masked digital surface model based on the digital terrain model, the vegetation segmentation mask and the 2.5D Digital Surface Model;
   generating a canopy height model based on the generated vegetation masked digital surface model; and
   generating at least one analysis with an analysis module, wherein the analysis module receives the generated canopy height model prior to execution of the analysis module, and wherein the analysis module uses the generated canopy height model in the generation of the at least one analysis.

10. The method of claim 9, further comprising:
    computing at least one of: at least one Key Performance Indicator and one or more vegetation-related statistics.

11. The method of claim 10, further comprising:
    receiving the computation by at least one of a vegetation management module, an allocation module for resource planning and a tree-trimming scheduling module.

12. The method of claim 9, wherein estimating the vegetation segmentation mask further comprises:
    receiving the image data at a segmentation process, wherein the image data includes a plurality of pixels representing an area of interest;
    identifying a category for each pixel in the area of interest;
    marking the received image with the identified category for each pixel; and
    outputting the marked received image as the vegetation segmentation mask.

13. The method of claim 12, wherein the mark identifies the vegetation pixels.

14. The method of claim 9, wherein the received image is a pair of images for an area of interest, and a first image of the pair of images is an image of the area of interest taken at a different angle from a second image of the pair of images.

15. The method of claim 14, wherein generating the 2.5D Digital Surface Model based on the received image data further comprises:
    matching all of the pixels from the first image to corresponding pixels in the second image; and
    generating the 3D point cloud.

16. A non-transitory, computer-readable medium storing instructions that, when executed by a computer processor, cause the computer processor to perform a method comprising:
    receiving image data;
    estimating a vegetation segmentation mask;
    generating a 2.5D Digital Surface Model based on the received image data, wherein the 2.5D Digital Surface Model is a representation of a 3D point cloud as a 2.5D grid format and the representation is generated via a binning process that combines multiple depth images of a same area of interest to merge the multiple depth images into a single depth image;
    estimating a relief surface using a digital terrain model, wherein the digital terrain model is a model of shapes of a terrain over a region and across a range of terrain types;
    generating a vegetation masked digital surface model based on the digital terrain model, the vegetation segmentation mask and the 2.5D Digital Surface Model;
    generating a canopy height model based on the generated vegetation masked digital surface model; and
    generating at least one analysis with an analysis module, wherein the analysis module receives the generated canopy height model prior to execution of the analysis module, and wherein the analysis module uses the generated canopy height model in the generation of the at least one analysis.

17. The computer-readable medium of claim 16, wherein estimating the vegetation segmentation mask further comprises:
    receiving the image data at a segmentation process, wherein the image data includes a plurality of pixels representing an area of interest;
    identifying a category for each pixel in the area of interest;
    marking the received image with the identified category for each pixel; and
    outputting the marked received image as the vegetation segmentation mask.

18. The medium of claim 17, wherein the mark identifies the vegetation pixels.

* * * * *